United States Patent [19]
Wilson

[11] Patent Number: 5,960,213
[45] Date of Patent: Sep. 28, 1999

[54] DYNAMICALLY RECONFIGURABLE MULTI-FUNCTION PCI ADAPTER DEVICE

[75] Inventor: Malcolm Eric Wilson, Weybridge, United Kingdom

[73] Assignee: 3D Labs Inc. Ltd, Hamilton, Bermuda

[21] Appl. No.: 08/763,855

[22] Filed: Dec. 11, 1996

Related U.S. Application Data

[60] Provisional application No. 60/008,817, Dec. 18, 1995, and provisional application No. 60/017,829, Jun. 4, 1996.

[51] Int. Cl.⁶ ............................................... G06F 13/00
[52] U.S. Cl. ........................... 395/822; 395/830; 395/651
[58] Field of Search ..................................... 395/651, 652, 395/653, 828, 830, 822

[56] References Cited

U.S. PATENT DOCUMENTS

| | | | |
|---|---|---|---|
| 5,596,729 | 1/1997 | Lester et al. | 395/308 |
| 5,608,876 | 3/1997 | Cohen et al. | 395/281 |
| 5,611,057 | 3/1997 | Pecone et al. | 395/282 |
| 5,724,529 | 3/1998 | Smith et al. | 395/309 |

OTHER PUBLICATIONS

New IBM PCI to PCI Bridge Chip Expands PCI Core Logic Chipset Offerings, Press Release: Nov. 7, 1994.
Motorola Unveils PCI Bridge for PowerPC(TM) Microprocessors, Press Release: Aug. 16, 1994.
Duffy, Pat, All You Ever Wanted To Know About PCI, Oct. 1995.
PCI SIG, PCI FAQ (Frequently Asked Questions), http://www.teleport.com/ pc2/pcifaq.html.
PCI Fundamentals, Intel. May 5, 1995.

*Primary Examiner*—Kevin A. Kriess
*Attorney, Agent, or Firm*—Matthew S Anderson

[57] ABSTRACT

A PCI compliant device having an internal function and a secondary PCI port for a second PCI device having additional functions. The device adapts its internal function and memory and the functions and memory of the second PCI device such that the host system sees only a single multi-function device, which appears to have the combined memories and functions of the adapter and second PCI device. Preferably the adapter itself includes a graphics preprocessor, and is connected to one or more rendering processors on the second PCI port.

20 Claims, 6 Drawing Sheets

| | Standard | Function 1 VGA |
|---|---|---|
| 000h–0ffh | Internal Function | External Function 1 (VGA) |
| 100h–1ffh | External Function 1 | Internal Function |
| 200h–2ffh | External Function2 | External Function2 |
| 300h–3ffh | | |
| 400h–4ffh | | |
| 500h–5ffh | | |
| 600h–6ffh | | |
| 700h–7ffh | | |

Configuration Region Address Map

| Offset | Function | Byte Swap Offset |
|---|---|---|
| 0000.0000h - 0000.0FFFh | Control Status Registers | 0001.0000h - 0001.0FFFh |
| 0000.1000h - 0000.17FFh | Localbuffer Registers | 0001.1000h - 0001.17FFh |
| 0000.1800h - 0000.1FFFh | Framebuffer Registers | 0001.1800h - 0001.1FFFh |
| 0000.2000h - 0000.2FFFh | GC FIFO Interface | 0001.2000h - 0001.2FFFh |
| 0000.3000h - 0000.3FFFh | Internal Video Registers | 0001.3000h - 0001.3FFFh |
| 0000.4000h - 0000.7FFFh | External Video Registers | 0001.4000h - 0001.7FFFh |
| 0000.8000h - 0000.FFFFh | GC Register Access (through FIFO) | 0001.8000h - 0001.FFFFh |

DYNAMICALLY RECONFIGURABLE MULTI-FUNCTION PCI ADAPTER DEVICE

CROSS-REFERENCE TO RELATED APPLICATION

This application claims priority from provisional 60/008,817, filed Dec. 18, 1995, and provisional 06/017,829, filed Jun. 4, 1996, which are hereby incorporated by reference.

BACKGROUND AND SUMMARY OF THE INVENTION

The present application relates to PCI bus architectures, and particularly to interconnection, in a system which uses such a bus, of multiple chips which are concerned with rendering.

Background: PCI Bus

PCI, or Peripheral Component Interconnect, is a standard for interconnecting the peripherals, e.g. cards which are plugged into the motherboard) with both the system memory and the CPU of a computer system. Full technical details may be found in the *PCI Local Bus Specification* 2.1 (PCI SIG, 1995), which is hereby incorporated by reference. It was designed from the start to alleviate many of the headaches that installation of a new card into an ISA bus-based computer would cause (IRQ conflicts, address conflicts, etc.). All PCI standards are set by a committee to ensure wide industry support. The PCI Bus is described in detail below.

Background: PCI Bridge

Overview and Terminology

A PCI to PCI bridge provides a connection path between two independent PCI busses. The primary function of the bridge is to allow transactions to occur between a master on one PCI bus and a target on the other PCI bus. PCI to PCI bridges provide system and option card designers the ability to overcome electrical loading limits by creating hierarchical PCI busses. To aid in the discussion of PCI to PCI bridge architecture the following terminology is used:

initiating bus—the master of a transaction that crosses a PCI to PCI bridge is said to reside on the initiating bus.

target bus—the target of a transaction that crosses a PCI to PCI bridge is said to reside on the target bus.

primary interface—the PCI interface of the PCI to PCI bridge that is connected to the PCI bus nearest to the CPU is referred to as the primary PCI interface.

secondary interface—the PCI interface of the PCI to PCI bridge that is connected to the PCI bus farthest from the CPU is referred to as the secondary PCI interface.

downstream—transactions that are forwarded from the primary interface to secondary interface of a PCI to PCI bridge are said to be flowing downstream.

upstream—transactions that are forwarded from the secondary interface to primary interface of a PCI to PCI bridge are said to be flowing upstream.

Thus, a PCI to PCI bridge has two PCI interfaces, the primary and secondary. Each interface is capable of either master or target operation. The bridge functions as a target on the initiating bus on behalf of the target that actually resides on the target bus. Likewise, the bridge functions as a master on the target bus on behalf of the master that actually resides on the initiating bus.

FIG. 1 illustrates two typical applications for a PCI to PCI bridge. A PCI to PCI bridge allows transactions between a master on one PCI interface to a target on the other interface as illustrated in FIG. 2.

Innovative System and Preferred System Context

The GLINT Delta Multifunction Adapter

The present application discloses a method and device for a PCI compliant device having an internal function and a secondary PCI port for a second PCI device having additional functions. The device adapts its internal function and memory and the functions and memory of the second PCI device such that the host system sees only a single multi-function device, which appears to have the combined memories and functions of the adapter and second PCI device. The disclosed embodiment relates to an adapter with a graphics pre-processor, supporting a PCI compliant graphics device with up to two graphics processors on the second PCI port.

The GLINT Delta acts as a multi-function adaptor to allow multiple PCI devices to be placed on an expansion card. The GLINT Delta graphics processor acts as one PCI load. The PCI specification allows for a PCI device to have up to 8 functions, each of which has its own configuration space. In the preferred embodiment, GLINT Delta supports 2 external functions, and also has one internal function containing the Delta Unit.

The GLINT Delta Multifunction Adapter is not a PCI bridge. The innovative adapter does more than allow transactions between a master on one PCI interface and a target on the other interface—it adapts multiple devices, each having one or more PCI functions, to a single PCI port. To the host system, this port appears to be a single device having all the functions of the multiple devices. In fact, the Primary PCI Bus of FIG. 3 (described fully below) could be connected to a PCI Bridge, and thereby to the host system.

Delta Processor Unit

The Delta Unit in the GLINT Delta implements the slope calculations and data conversion for graphics primitives in one unit. This unit can be considered as being positioned in front of the rasterizer in the GLINT 300SX/500TX or PERMEDIA pipelines. The GLINT Delta accepts the coordinates of vertices plus color, depth, fog and texture parameters. The Delta Unit calculates the parameters required by the GLINT 300SX/500TX or PERMEDIA. GLINT Delta will accept the input parameters in either fixed point format or IEEE single precision floating point format. Internal calculations in GLINT Delta are performed in floating point format. Vertex sharing for meshes, fans and polylines is supported with the shared vertices only being loaded once. An optional normalize operation may be applied to texture parameters. This operation calculates the maximum absolute value of the texture parameters for a primitive and normalizes all the texture parameters to lie in range −1.0 to 1.0. Normalizing the texture parameters ensures that maximum accuracy is achieved by the texture unit in the GLINT 500TX and PERMEDIA.

The operations in the Delta Unit remove a considerable amount of work from the host processor. However since the transformation and lighting calculations are still performed by software on the host processor, GLINT Delta is able to support all the widely available 3D graphics APIs.

BRIEF DESCRIPTION OF THE DRAWING

The disclosed inventions will be described with reference to the accompanying drawings, which show important sample embodiments of the invention and which are incorporated in the specification hereof by reference, wherein:

FIG. 6 shows a configuration region address map for the preferred device.

FIG. 7 shows the control register space partitioning of the preferred device.

DETAILED DESCRIPTION OF THE PREFERRED EMBODIMENTS

The numerous innovative teachings of the present application will be described with particular reference to the presently preferred embodiment (by way of example, and not of limitation), in which:

Multifunction Adapter

The GLINT Delta contains two on-chip PCI Local Bus interfaces: the primary interface communicates with the host processor and the secondary interface communicates with other PCI devices such as GLINT 300SX/500TX, PERMEDIA or an AVGA device.

GLINT Delta functions as a PCI to PCI multi-function adaptor. So, in addition to calculating the slope and setup information, the GLINT Delta can act as a bridge between the PCI bus and multiple graphics devices. This capability may be used in various ways:

Driving dual GLINT 500TX devices for increased rendering speed;

Driving a GLINT rendering device plus an AVGA device for 3D acceleration with on-board VGA.

A dual GLINT 500TX accelerator using GLINT Delta graphics preprocessing.

GLINT Delta PCI Interface

Figure 3:
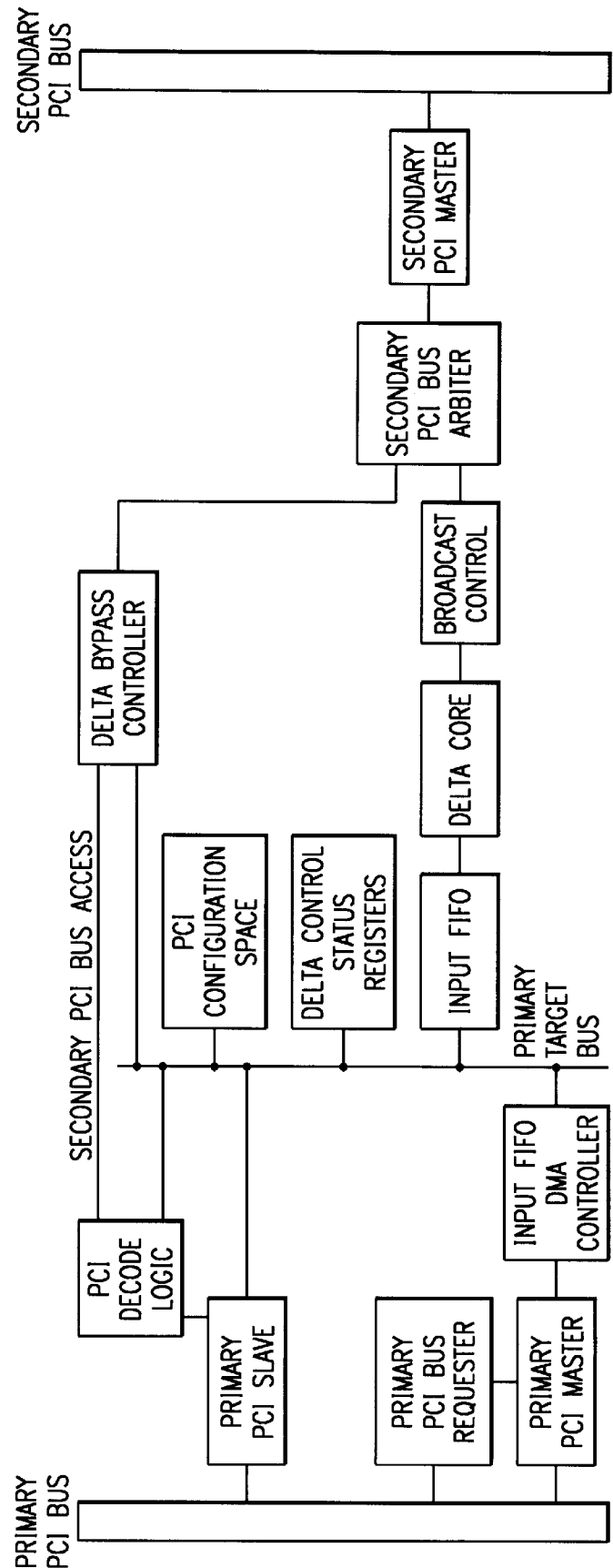
FIG. 3 shows a block diagram of a multifunction adapter according to the preferred embodiment.

The GLINT Delta has two PCI ports; the primary PCI bus which supplies control and data to the chip from the host processor, and the secondary PCI bus to which other PCI devices can be connected without any extra 'glue' logic. A block diagram of the preferred embodiment is shown in FIG. 3.

Primary (Host) PCI Interface

The interface between the host and the GLINT Delta is a Peripheral Component Interconnect (PCI) Local Bus interface. PCI has been defined to establish an industry standard high performance local bus and is intended for use as an interconnect between highly integrated peripheral controller components and processor/memory systems. The host interface is 32-bit PCI Master/Slave conforming to the PCI Local Bus Specification (Revision 2.1) and contains both a FIFO and a DMA controller. The FIFO is 32 bits wide and 32 locations deep. Control registers for the host interface are memory mapped onto the PCI bus.

Two modes of operation are available for communication between the host and the GLINT Delta. The host can write directly to the FIFO and in this case the GLINT Delta operates as a PCI slave. Alternately the GLINT Delta can be programmed to become PCI master and use the internal DMA controller to fetch commands into the FIFO using Block Command Transfer. The host interface provides a bypass path to the secondary PCI interface. Hence the host may directly access the devices attached to the secondary PCI bus. GLINT 300SX/500TX or PERMEDIA output FIFOs are accessed through the GLINT Delta bypass path. If two rendering devices are present in the system, then for software compatibility the output FIFO of one rendering device may be accessed through the GLINT Delta control register space, thus avoiding device conflict.

The GLINT Delta supports both little-endian and big-endian host processors. A big-endian processor, e.g. PowerPC, will generate byte swapped big-endian data on the PCI local bus, commonly known as gib-endian. The GLINT Delta can accept and convert gib-endian data and hence is Apple PowerMac compatible. A single PCI interrupt is provided as part of the host interface. This interrupt may be configured to the GLINT Delta DMA control signals and to interrupts supplied by devices on the secondary PCI bus.

Secondary PCI Interface

The secondary PCI interface allows up to two other PCI devices to be connected to the GLINT Delta. These devices may either be GLINT 300SX/500TX or PERMEDIA devices or may be other PCI devices, e.g. a VGA device. The secondary PCI interface includes the following features:

PCI Revision 2.1 compliance

Support for 2 PCI functions

Hardware handshake to optimize bus usage

Multiple broadcast

Any single function PCI device can be placed on this bus with some caveats depending on the number and type of Base Address Registers (BARs) used by the device, which define the addressable range of the device memory. It is not able to access devices on the primary PCI bus.

Multi-function Support

The GLINT Delta acts as a multi-function adaptor to allow multiple PCI devices to be placed on an expansion card. The GLINT Delta graphics processor acts as one PCI load. The PCI specification allows for a PCI device to have up to 8 functions, each of which has its own configuration space. In the preferred embodiment, GLINT Delta supports 2 external functions, and also has one internal function containing the Delta Unit.

Both external functions support up to 3 BAR s, each of which must be in memory space and be greater than 64 Kbytes and less than 64 MBytes in size. VGA devices are supported by the first external function. Normally the internal GLINT Delta function will map to PCI function 0 and the first external function will map to PCI function 1. However if the first external function is a VGA device, then it may be mapped to PCI function 0 with the internal GLINT Delta function mapped to PCI function 1. This capability ensures the correct operation of the PC BIOS for legacy VGA devices. The second external function maps to PCI function 2. If gaps are left in the PCI function mapping, then this may confuse a PC BIOS. Hence it is recommended that no gaps be left in PCI function mapping, e.g. if there is only one GLINT or PERMEDIA rendering device on the secondary PCI bus, then the internal Delta function should be mapped to PCI function 0 and the GLINT rendering device should be mapped to PCI function 1.

FIG. 3 shows a block diagram of the preferred Delta embodiment. In this figure:

Primary PCI Bus—This indicates the "upstream" side of communications, i.e. the host computer system.

Secondary PCI Bus—This connects to the "downstream" functions, i.e. the secondary PCI devices which the multifunction adapter is managing.

Primary Target Bus—In the preferred embodiment, this is the target bus, internal to the GLINT Delta, which connects to the internal function hardware, e.g. the GLINT Delta graphics pre-processor.

PCI Configuration Space, Delta Control Status Registers, Input FIFO, Delta Core, and Broadcast Control—these blocks function as the internal Delta graphics preprocessor, and behave as a standard single-function PCI device. In the preferred embodiment, these blocks function primarily as a target of, rather than a part of, the multifunction device hardware.

Primary PCI Bus Requester, Primary PCI Master, Input FIFO Controller—these blocks allow the internal and secondary functions to act as a PCI master, in a conventional manner, to directly access the upstream system. In this way, data on the upstream system may be transferred directly to the Input FIFO on the internal logic or on the secondary PCI device.

Primary PCI Slave—This block allows the GLINT Delta to act as a PCI slave and accept direct requests from the PCI master on the upstream system. These requests are placed on the primary target bus and passed to the PCI Decode Logic.

PCI Decode Logic—As described below, this block provides the key mapping of the PCI functions, both internal to the GLINT Delta and on the secondary PCI bus, to the primary PCI bus, so that the Delta and its downstream devices appear as a single multifunction device.

Delta Bypass Controller—this block serves to pass commands, requests, and data directly between the upstream system and the downstream device, when the PCI decode logic makes such a determination, without sending the data through the graphics preprocessor or other internal PCI function hardware.

Secondary PCI Bus Arbiter—When calls are made to or from the secondary PCI bus, this block arbitrates between the bypass controller, which leads directly to the primary PCI bus, and the broadcast control of the internal hardware.

Secondary PCI Master—this controls the downstream devices, which function as conventional PCI slaves.

The decode logic functions to track requests from the upstream system and to route them to the appropriate PCI device, whether the internal device or the device or devices on the secondary port.

When the host system is initialized, it typically sends a query to the Primary PCI Bus which requests information regarding the number and type of functions on the primary target bus and secondary PCI bus. Other information may be sent, including the size of any memories internal to Delta or on the secondary device.

When in use, Delta performs all necessary mapping from the memory addresses and function calls of the host system to and from the actual addresses and PCI function IDs, as defined by the internal hardware or the secondary devices.

PCI Multifunction Mapping

The GLINT Delta performs four primary functions in the PCI configuration space to force the host system to view the Delta and any secondary PCI devices as a single multifunction device.

1. In the preferred embodiment, each PCI target below Delta is a single function device. The PCI specification allows for up to 8 functions (0–7) within a device. Each function has 256 Bytes of configuration registers. A single function device, compliant with the PCI specification, will always be function 0. Delta therefore examines the PCI configuration space function address bits and route each instruction for a particular function on the Primary PCI bus to the correct Target chip function 0 on the Secondary PCI bus.

2. A PCI multifunction device must signal that it is multifunctional by setting bit 7 of the Configuration space 'Header Type' register. As each target is single function, in the preferred embodiment, this bit is not set by the Target. Delta must not only set this bit when the 'Header Type' register is read from its own configuration but also for reads of the Target configuration region 'Header Type' registers.

Figure 4:
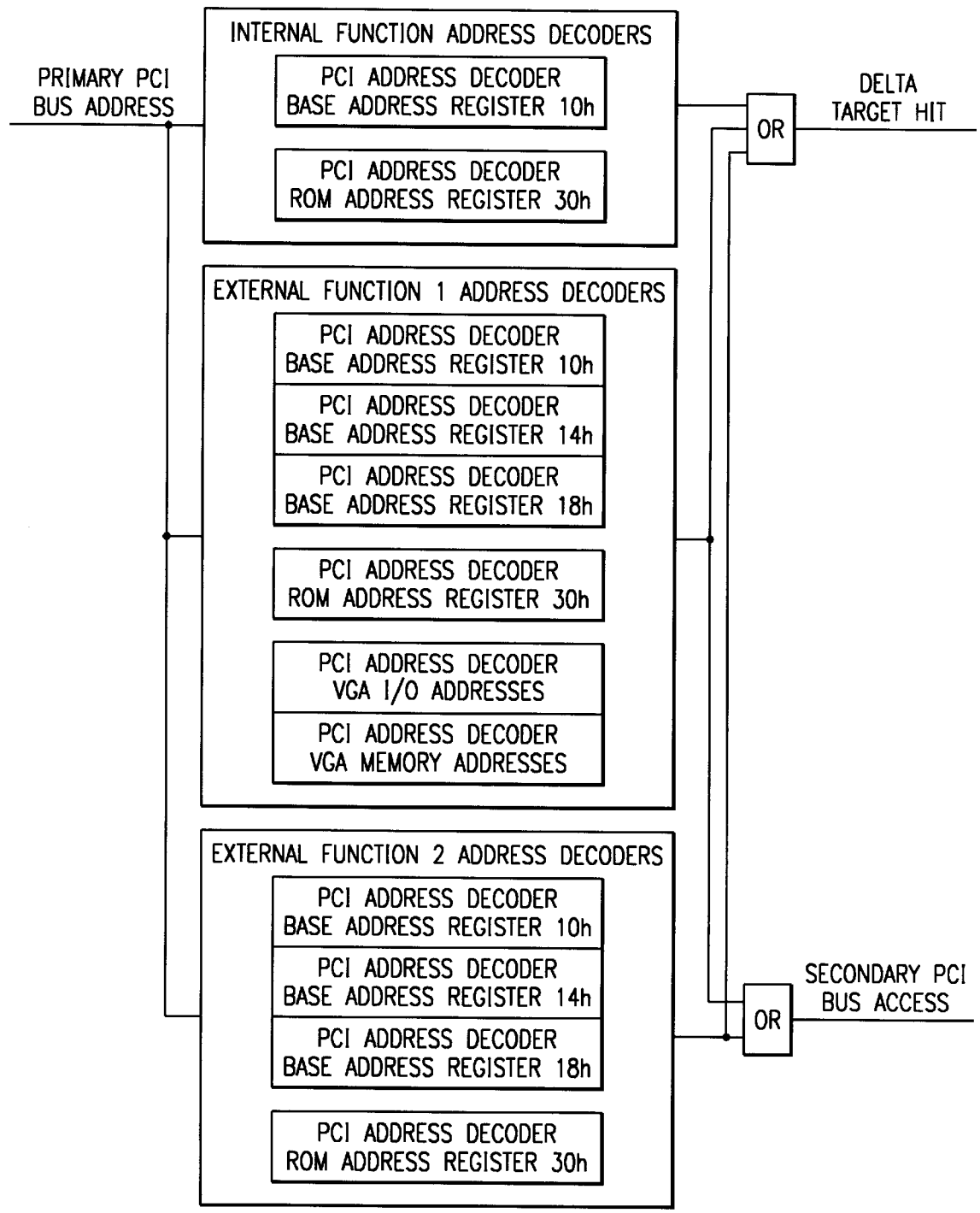
FIG. 4 shows a block diagram of the PCI decode logic according to the preferred embodiment.

3. Memory accesses to and from the Target Devices must be passed through the GLINT Delta. To do this Delta provides 'shadow' Target Base Address Register decoders, as shown in FIG. 4. Delta has three decoders for each target, i.e. Base Address registers 0, 1, and 2. Delta also has a shadowing decoder for the ROM region for each Target Device. Block diagrams of these decoders are shown in FIGS. 5a and 5b.

Figure 5A:
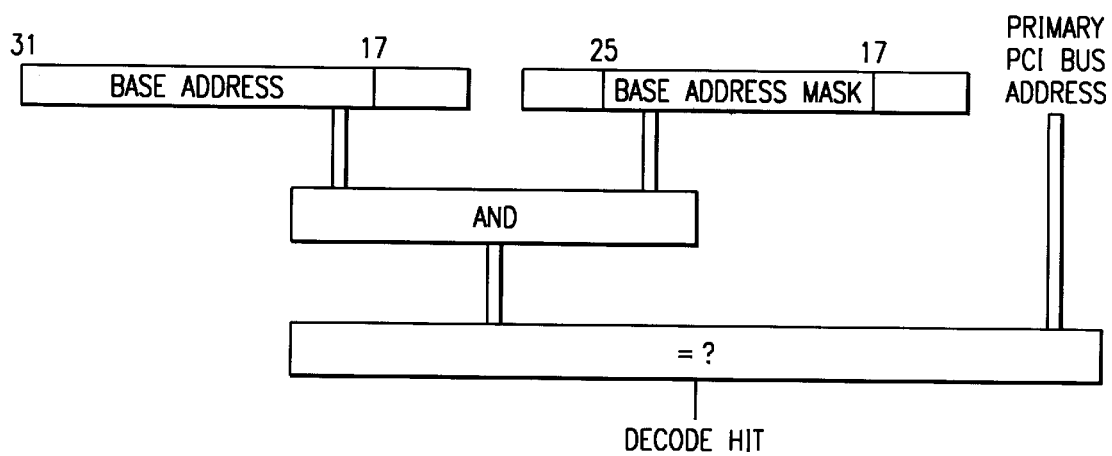
FIGS. 5a and 5b show a block diagram of the Base Address Register Decoder and ROM Address Register Decoder, respectively, according to the preferred embodiment.
Figure 5B:
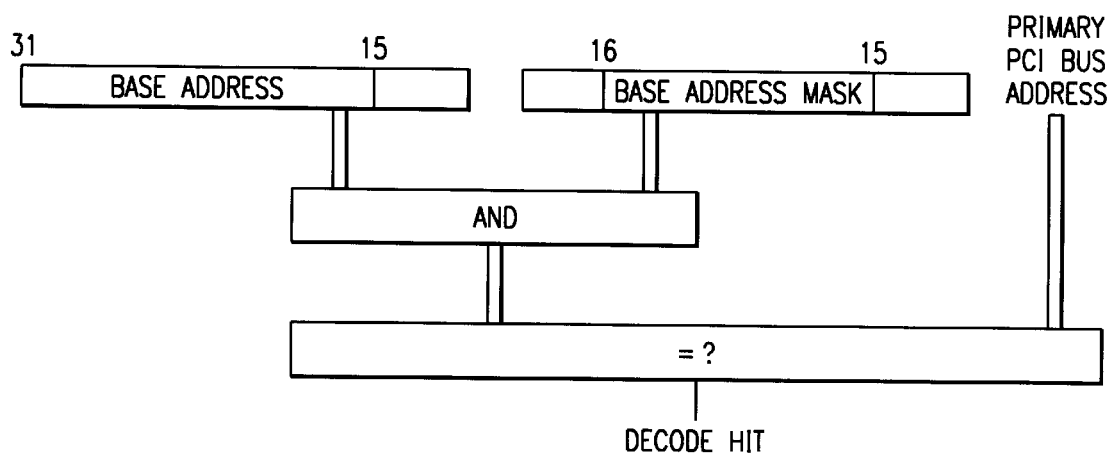

In FIG. 5a, the Base Address Register Decoders supports 64 Kbyte to 64 Mbyte PCI regions, and the ROM Address Register Decoder, shown in FIG. 5b, supports 32 Kbyte to 64 Mbyte PCI regions. The Base Address field is loaded when the associates Base address register is loaded. The Base Address Mask field is loaded with the data read back from the associated Base Address Register after the hex value FFFFFFFF is written to it, This action is used by the PCI BIOS to test for the size of the region. As this occurs, the GLINT Delta monitors this action so that it knows the size of the region as well.

4. Delta must monitor and shadow accesses to each Target's PCI Configuration space 'Command register'. Memory accesses must only be forwarded to a Target device if the 'Memory Space' access enable bit for that Target device is set.

In addition to the above, in the preferred embodiment, Delta supports one Target Device being a VGA device. To achieve this the Delta forwards PCI I/O and memory accesses to the VGA Target Device if it is enabled.

PCI Bus

PCI, or Peripheral Component Interconnect, is a standard for interconnecting the peripherals, e.g. cards which are plugged into the motherboard) with both the system memory and the CPU of a computer system. Full technical details may be found in the *PCI Local Bus Specification* 2.1 (PCI SIG, 1995), which is hereby incorporated by reference. It was designed from the start to alleviate many of the headaches that installation of a new card into an ISA bus-based computer would cause (IRQ conflicts, address conflicts, etc.). All PCI standards are set by a committee to ensure wide industry support. Some of its major features are:

a) Multiple busmasters on the same bus. (Several SCSI controllers running at the same time, for example.)

b) Auto-configuring. All components which plug into the PCI bus will be configured by the BIOS, making jumpers for this unnecessary.

c) IRQ sharing. The PCI bus is able to share a single interrupt between cards.

d) High bus bandwidth. The PCI bus runs at a maximum rate of 33 MHz (66 MHz in PCI 2.1) and is capable of transferring 32 bits (4 bytes) per clock cycle, for a maximum throughput of 132 MB/sec (264 in PCI 2.1). However, bus latency times usually lower this to significantly less than maximum in real implementations).

e) Multiple functions on one card. The PCI specification allows for up to 8 functions (video, sound . . . ) on a single card.

Revision 2.0 of the PCI standard is currently implemented in older-generation motherboards. It has all the features and limitations discussed above.

Revision 2.1 of the PCI standard is, as of November 1996, widely available in the current generation of shipping motherboards. It includes the following changes from PCI 2.0:

Backwards compatible with PCI 2.0.

If a PCI 2.1-compliant card and a PCI 2.0-compliant card are on the same bus, the PCI bus will be run at 33 MHz instead of 66. 66 MHz (maximum) bus speeds. 64-bit extensions are defined in PCI 2.1.

PCI to PCI bridges, which will allow for more than three or four PCI slots per motherboard. In addition, some PCI cards exploit this bridging capability to obtain multiple SCSI channels in a single PCI slot.

PCI Bridge

Overview and Terminology

A PCI to PCI bridge provides a connection path between two independent PCI busses. The primary function of the bridge is to allow transactions to occur between a master on one PCI bus and a target on the other PCI bus. PCI to PCI bridges provide system and option card designers the ability to overcome electrical loading limits by creating hierarchical PCI busses. To aid in the discussion of PCI to PCI bride architecture the following terminology is used:

initiating bus—the master of a transaction that crosses a PCI to PCI bridge is said to reside on the initiating bus.

target bus—the target of a transaction that crosses a PCI to PCI bridge is said to reside on the target bus.

primary interface—the PCI interface of the PCI to PCI bridge that is connected to the PCI bus nearest to the CPU is referred to as the primary PCI interface.

secondary interface—the PCI interface of the PCI to PCI bridge that is connected to the PCI bus farthest from the CPU is referred to as the secondary PCI interface.

downstream—transactions that are forwarded from the primary interface to secondary interface of a PCI to PCI bridge are said to be flowing downstream.

upstream—transactions that are forwarded from the secondary interface to primary interface of a PCI to PCI bridge are said to be flowing upstream.

Thus, a PCI to PCI bridge has two PCI interfaces, the primary and secondary. Each interface is capable of either master or target operation. The bridge functions as a target on the initiating bus on behalf of the target that actually resides on the target bus. Likewise, the bridge functions as a master on the target bus on behalf of the master that actually resides on the initiating bus.

Figure 1:
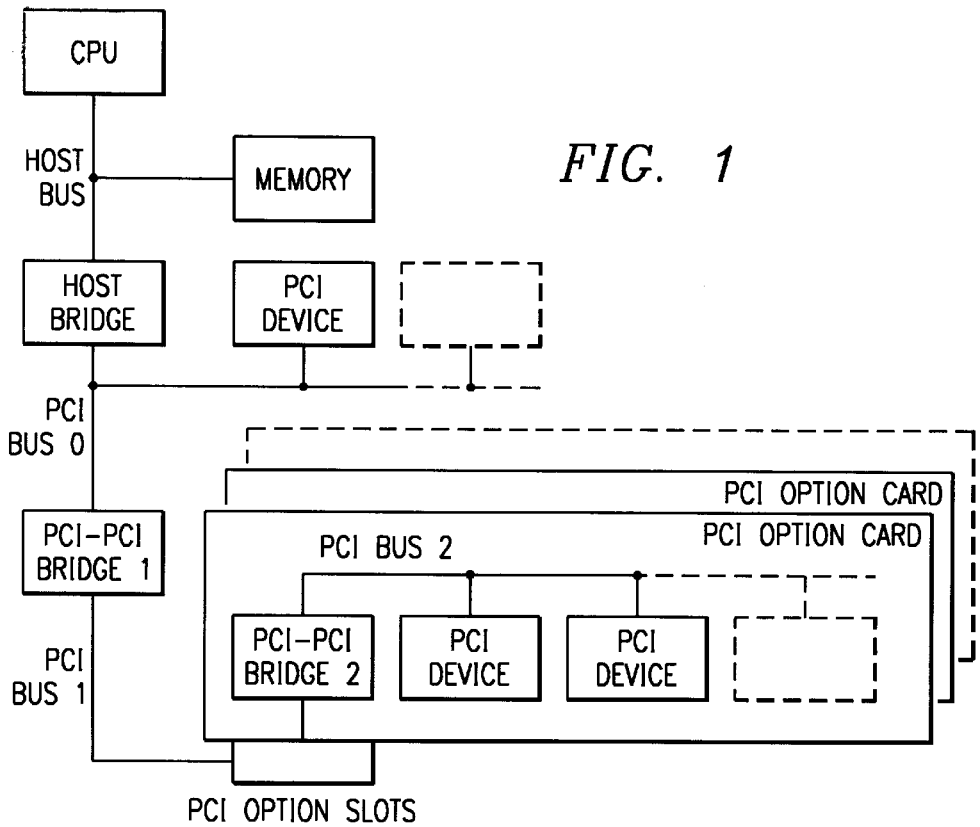
FIG. 1, described above, shows a typical application for a PCI bridge.

FIG. 1 illustrates two typical applications for a PCI to PCI bridge. In FIG. 1, the primary interface of PCI to PCI bridge 1 is connected to PCI bus 1. Likewise, the primary interface of PCI to PCI bridge 2 is connected to PCI bus 1 and its secondary interface is connected to PCI bus 2. Note that the number of the bus located behind a bridge matches the number of the bus bridge component. The host bridge is considered to be bridge number 0.

Figure 2:
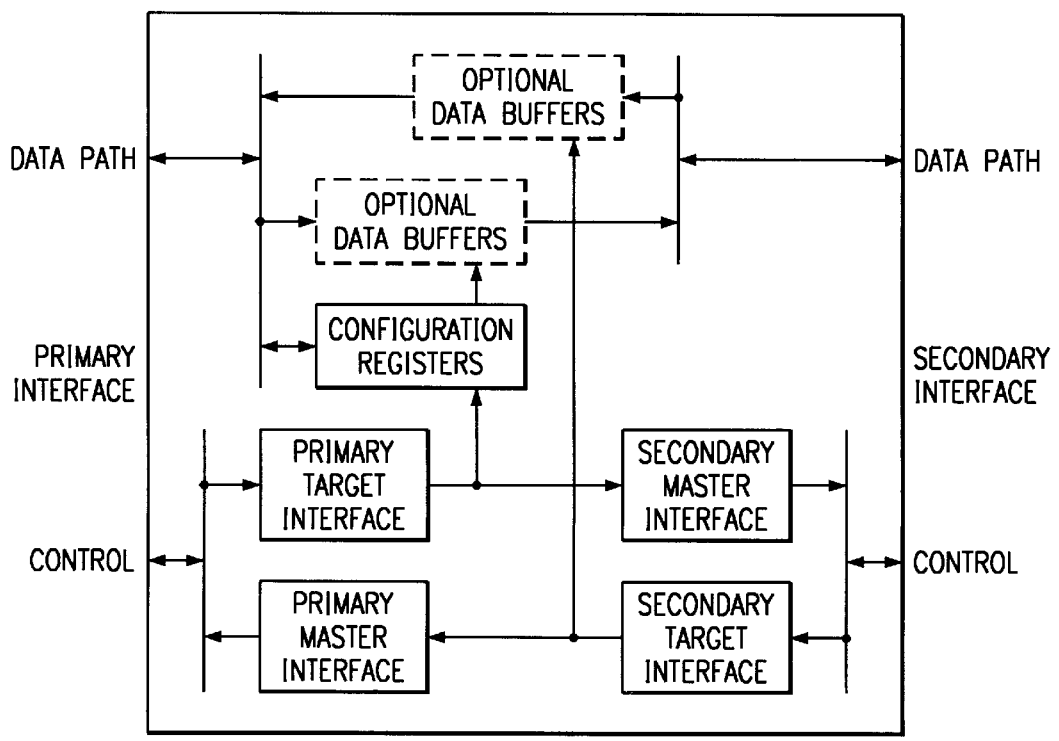
FIG. 2 shows a block diagram of a typical PCI bridge.

A PCI to PCI bridge allows transactions between a master on one PCI interface to a target on the other interface as illustrated in FIG. 2. The target interface on one bus is connected to the master interface on the other bus. The block between the target and master interface blocks may or may not include data buffering. The target block connected to the primary PCI interface must support PCI configuration space, which is described in detail below. The bridge basically consists of four state machines—two masters and two targets. Each of the Master and Target interface state machines must adhere to the requirements of the PCI Local Bus Specification.

Bridge Requirements

Required Capabilities

Some examples of the requirements of a PCI to PCI bridge are listed below. However, the requirements are not limited to those listed, as indicated in the PCI Bridge Architecture Specification.

A PCI to PCI bridge must be compliant with the current PCI Local Bus Specification. Some of the implications for PCI to PCI bridges are listed below.

The bridge must adhere to the electrical loading limits for all PCI signals. For add-in card applications this means that the PCI to PCI bridge is limited to a single connection per PCI signal (for example, CLK). As a result, PCI to PCI bridges must buffer the CLK signal received from the option card connector for distribution to other PCI components on the add-in card which connect tot he secondary interface of the bridge.

The bridge must support the range of operation from DC to 33 MHz. The relationship between the primary interface and secondary interface clocks of a PCI to PCI bridge is implementation specific.

PCI to PCI bridges cannot require side band signal for correct operation when used in add-in card applications since the PCI connector does not support any sideband signals.

The bridge must maintain data coherency and consistency when transactions cross the bridge in either direction.

The bridge must adhere to the 8 clock completion rule for subsequent data phases when acting as the target.

A PCI to PCI bridge must comply with other requirements set forth in the *PCI to PCI Bridge Architecture Specification* (PCI SIG, 1994), which is hereby incorporated by reference. Some examples of required capabilities of a PCI to PCI bridge are listed below.

Configuration space adhering to the PCI to PCI Bridge header format.

Memory mapped I/O address space.

Hierarchical configuration support.

When the bridge supports the arbiter for the secondary bus it must be designed to prevent deadlocks. For example, the bridge might drop into a fairness algorithm to avoid potential deadlocks during exclusive transactions or when cacheable memory is supported on the secondary bus.

Capabilities Not Supported

Listed below are capabilities that are not supported by PCI to PCI bridges. It may be possible for PCI to PCI bridges to provide support for these capabilities but the PCI bridge specification does not attempt to make provisions for their support and in some cases may preclude it. There may be other capabilities not supported by PCI to PCI bridges that do not appear on the list below.

Support of downstream devices that require mapping to the first 1 Mb of memory space.

Support of downstream bridges to non-PCI busses.

ISA compatibility addressing for devices other that VGA.

Access by ISA masters or ISA DMA of devices located on hierarchical PCI busses; it is assumed that ISA masters or ISA DMA access system memory only.

Support for unusual configurations, e.g.:

Using two PCI to PCI bridges to connect to a common secondary bus and different primary busses.

Multiple bridges connecting to same primary bus and same secondary bus.

Two bridges where the primary interface of one bridge is connected to the secondary interface of the other and vice versa.

Forwarding of Special Cycle transactions; special cycles are only supported through configuration type 1 commands.

Forwarding of Interrupt Acknowledge transactions.

Primary boot ROM on secondary interface; the bridge must be configured before access of downstream devices can occur Optional PCI Bridge Capabilities Listed below are capabilities that PCI to PCI bridges are not required to support but for which provisions have been made by this specification. These may be optionally supported by a PCI to PCI bridge provided they adhere to the requirements and guidelines established in this specification and the PCI Local Bus Specification. There may be other capabilities not listed below that can be supported but they are outside the scope of this application.

optional address ranges
I/O address range
prefetchable memory address range
VGA support
VGA addressing
VGA palette snooping
JTAG
64 bit addressing
64 bit data path
cacheable memory on the secondary bus
arbitration support for secondary bus devices
EPROM PCI Bridge Display Subsystem Initialization Initial Conditions As specified in the PCI Local Bus Specification and PCI Bridge Specification, the configuration bits controlling a bridge's or display device's response to VGA accesses is hardware initialized at power-up to the following states:

PCI to PCI Bridges (PPBs) power-on to ignore all VGA accesses
VGAEnable→0
VGASnoopEnable→0

VGA compatible devices (VGAs) power-on to "not snoop" VGA palette writes VGAPaletteSnoop→0

Initialization Algorithm

1. Identify boot VGA device, VGABoot. Search EISA first, then search PCI bus hierarchy top to bottom (i.e., starting at PCI Bus 0). The first VGA device encountered is the VGABoot device. If VGABoot is found on EISA, display initialization is complete. If found on PCI, save the PCI bus number, VGABusNum, (where VGABoot resides) and continue with steps 2–6.
2. Enable VGABoot's response to all VGA I/O and memory spaces by setting I/O Space and Memory Space enables in the device's configuration Command Register.
3. Starting at PCI bus VGABusNum, traverse the bus hierarchy up towards PCI bus 0. For each PCI to PCI bridge passed, set that bridge's VGAEnable configuration bit.
4. Starting at PCI bus number VGABusNum, search the PCI bus hierarchy under bus PCIBusNum (i.e., all busses secondary to PCIBusNum) bottoms-up scanning for GFXs (non-VGA compatible graphics devices). Once the first GFX device is found, flag that a GFX was found, and discontinue all downstream bus searches. Set the I/O Enable and VGAPaletteSnoop in that GFX's configuration Command Register. If no GFX is found downstream, then display initialization is complete. Otherwise, continue with steps 5–6.
5. Traverse back up the bus to VGABusNum. At each PCI to PCI bridge passed, set that bridge's VGASnoopEnable bit.
6. Set VGAPaletteSnoop in VGABoot's configuration Command Register. If not, clear the bit.

PCI Bandwidth

GLINT Delta considerably reduces the amount of PCI bandwidth used for sending data from the host to the graphics subsystem. For example consider Gouraud shaded, depth buffered triangles. For each new triangle in a mesh of Gouraud shaded, depth buffered triangles the host processor must pass ten 32 bit words to the GLINT Delta—X, Y, Z, R, G, B, A and three control words. A GLINT graphics system without GLINT Delta will require thirty three 32 bit words to render the same primitive. Hence GLINT Delta has reduced the host to graphics subsystem PCI bandwidth requirement by 70%. If the GLINT Delta peak performance of 700 K triangles/second is achieved, then the host would need to pass 27 MBytes of data per second to the GLINT Delta. This is well within the capabilities of standard PCI chipsets, for example the Intel Neptune chipset provides 40 MBytes/sec of PCI bandwidth for DMA operation and the Intel Triton chipset provides 80 MBytes/sec of PCI bandwidth.

PCI Configuration Region

The PCI Configuration Region provides a set of "hooks" which satisfies the needs of current and anticipated system configuration mechanisms. The configuration registers are accessed and modified by the use of Configuration Read and Write commands.

As GLINT Delta is a multi-function device, the configuration space is split into eight 256-byte blocks. GLINT Delta has one internal function and up to 2 external functions. The order of the functions as seen by the PCI interface is dependent on whether external function 1 is a VGA device, as shown, e.g., in FIG. 6.

GLINT Delta will only respond to configuration space accesses for which devices exist. Hardware mode pins are used to indicate which of the external functions are populated in the system. A mode pin is used to indicate that external function 1 is a VGA device. These mode pins are described elsewhere in this specification.

Internal Function Configuration Registers 64 bytes of the Configuration registers are predefined within the PCI Specification and are supported by GLINT Delta. The remaining 192 Bytes are device specific and are unused by GLINT Delta, returning the value zero.

---

Device Identification

Vendor ID

Vendor identification number.
CFGVendorId
Region: Config   Offset: 00h
Read Only Reset Value: 3D3D
Bits 15–0   3D3Dh
3Dlabs company code
Device ID Device identification number.
CFGDeviceId
Region: Config   Offset: 02h
Read Only Reset Value: 0003h
Bits 31–16 0003h
GLINT Delta Device number
Revision ID Revision identification number.
CFGRevisionId
Region: Config Offset: 08h
Read Only Reset Value: Revision Number
The revision ID register returns the following code:
   Bits 7 – 0 Revision
   01h = Revision R01
Class Code Register CFGClassCode
Region: Config Offset: 09h
Read Only Reset Value: 038000h
Bits 31–24 03h
   Base class. PCI Definition: Display controller
Bits 23–16 80h
   Sub class. PCI Definition: Other Display controller (not VGA or XGA)
Bits 15–8 00h
   Device class
Header Type CFGHeaderType
Region: Config Offset: 0Eh
Read Only Reset Value: 80h
Bits 23–16 80h
Header Type. PCI Definition: Multi- function device

---

Device Control

Command Register

The command register provides control over a ability of a device to generate and respond to PCI cycles. Writing zero to this register disconnects the device from the PCI for all except configuration accesses. All necessary bits within the command register are supported for the functionality contained in GLINT Delta.

---

CFGCommand
Region: Config Offset: 04h
Read/Write Reset Value: 0000h
Bit 0 I/O access enable   (Read Only)
   0 = GLINT Delta has no I/O space regions
Bit 1 Memory access enable
   0 = Disable memory space accesses. (RESET)
   1 = Enable memory space accesses
Bit 2 Master enable
   0 = Disable master accesses. (RESET)
   1 = Enable master accesses
Bit 3 Special Cycle access enable   (Read Only)
   0 = GLINT Delta never responds to special cycle accesses.
Bit 4 Memory Write and Invalidate enable   (Read Only)
   0 = GLINT Delta master never issues Memory Write and Invalidate accesses.
Bit 5 VGA palette snoop enable   (Read Only)
   0 = GLINT Delta is not a VGA device.
Bit 6 Parity error report enable   (Read Only)
   0 = GLINT Delta does not report parity errors.
Bit 7 Address/Data stepping enable   (Read Only)
   0 = GLINT Delta does not do stepping.
Bit 8 SERR driver enable   (Read Only)
   0 = GLINT Delta does not report parity errors.
Bit 9 Master Fast back-to-back enable   (Read Only)
   0 = The GLINT Delta master does not implement fast back-to-back accesses.

---

Device Status

Status Register

The Status Register is used to record status information for PCI related events. The definition for each bit is given below. Reads to this register behave normally. Writes function differently in that bits can be reset but not set. A bit is reset whenever the register is written and the data in the corresponding bit location is a 1.

---

CFGStatus
Region: Config   Offset: 06h
Read Only   Reset Value: 00h
Bits 22–16 Reserved (Read Only)
   0000000b
Bit 23   Fast back-to-back Transactions (Read Only)
   1 = Indicates support for fast back-to-back PCI transactions.
Bit 24   Master Parity check flag   (Read Only)
   0 = Parity checking not implemented on GLINT Delta.

-continued

CFGStatus
Bits 26–25 10b (Read Only)
  Indicates that GLINT Delta asserts DevselN at medium speed.
Bit 27 Target Abort flag (Read Only)
  0 = GLINT Delta never issues a target abort.
Bit 28 Master Target Abort flag
  Set by master when transaction terminates with target abort.
Bit 29 Master Abort flag
  Set by master when it terminates transaction with master abort.
Bit 30 SERR flag (Read Only)
  0 = Parity checking not implemented on GLINT Delta.
Bit 31 PERR flag (Read Only)
  0 = Parity checking not implemented on GLINT Delta.

Miscellaneous Functions

BIST

Optional register used for control and status of BIST.
CFGBist

Region: Config  Offset: 0Fh
Read Only Reset Value: 00h
Bits 31–24 BIST (Read only)
  00h. BIST unsupported by GLINT Delta over the PCI interface.

Latency Timer

This register specifies, in PCI bus clocks, the value of the Latency Timer for this PCI bus master.
CFGLatTimer Region: Config  Offset: 0Dh
Read/Write Reset Value: 00h
Bits 15–8 Latency Timer Count
  Sets the maximum number of PCI clock cycles for master burst accesses.

Cache Line Size

This register specifies the cache line size in units of 32 bit words. It is only implemented for masters which use the "Memory write and invalidate" command. GLINT Delta does not use this command.

CFGCacheLine
Region: Config  Offset: 0Ch
Read Only  Reset Value:  00h
Bits 7–0  Cache Line Size
  00h. Cache line size unsupported.

Maximum Latency

This register specifies how often the PCI device needs to gain access to the PCI bus.

CFGMaxLat
Region: Config  Offset: 3Fh
Read Only Reset Value:  80h

Bits 31–24 Maximum Latency (Read only)
  80h

Minimum Grant

This register specifies how long a burst period the PCI device needs.

CFGMinGrant
Region: Config  Offset: 3Eh
Read Only Reset Value: 80h
Bits 23–16 Minimum Grant (Read only)
  80h

Interrupt Pin

The Interrupt Pin register tells the BIOS which interrupt line GLINT Delta uses.

CFGIntPin
Region: Config  Offset: 3Dh
Read Only Reset Value  01h
Bits 15–8 Interrupt Pin
  01h  GLINT Delta uses Interrupt pin A

Interrupt Line

The Interrupt Line register is an 8 bit register used to communicate interrupt line routing information.

CFGIntLine
Region: Config  Offset: 3Ch
Read/Write Reset Value: 00h
Bits 7–0  Interrupt Line

Base Addresses

The base address registers allow the boot software to relocate PCI devices in the address spaces. At system power-up device independent software must be able to determine which devices are present, build a consistent address map, and determine if a device has an expansion ROM. GLINT Delta has just one region. All other Base address registers are read only and return the value 0000.0000h. GLINT Delta does not have an expansion ROM and so the expansion ROM base address is also read only, returning the value 0000.0000h.

Base Address 0 Register

The Base Address 0 Register contains the GLINT Delta control space offset. The control registers are in memory space. They are not prefetchable and can be located anywhere in 32 bit address space.

CFGBaseAddr0
Region: Config  Offset: 10h
Read/Write  Reset Value:  0000.0000h
Bits 31–17  Base offset
  Loaded at boot time to set offset of the control register space.

```
Bits 16–4    Size indication    Read Only
      000h   Indicates that the control registers must be mapped
             into 128 KBytes.
Bits 3–0     Address Type       Read Only
      0h     Memory Space, not prefetchable, in 32 bit address
             space
```

Region 0—Control Registers

Region 0 Address Map

The GLINT Delta region 0 is a 128 KByte region containing the control registers and ports to and from the GLINT and PERMEDIA Graphics Core.

The 64 Kbyte control space is mapped twice in the 128 KByte region. The lower 64 Kbyte region is for access by little-endian processors. The top 64 Kbytes includes byte swapping for big-endian processors. The control register space is partitioned as shown in FIG. 7.

Control Status Registers

The GLINT Delta Control Status Register region is split into two sections. The lower section allows direct access to the control status registers of the GLINT or PERMEDIA rendering device connected to GLINT Delta. Some of the registers in this section are actually GLINT Delta registers which are shadowing GLINT 300SX/500TX or PERMEDIA operations for software compatibility with systems without GLINT Delta.

The upper section has additional GLINT Delta registers which are documented below. See also the GLINT 300SX/500TX or PERMEDIA Hardware Reference Manual, incorporated by reference above, for details on registers in the lower region.

Reset Status Register

Writing to the reset status register forces a software reset of the GLINT Delta Graphics Core. The software reset does not reset the GLINT Delta primary PCI interface. It is provided for software diagnostics in case an incorrect register set up locks up the GLINT Delta internal GC.

The software reset takes a number of cycles and the GC must not be used during the reset. A flag in the register is provided which shows that the software reset is still in progress.

For more information on the operation of the GLINT Delta at reset. Various mode pins are sampled at reset, these pins are described below.

```
ResetStatusRegion: 0      Offset: 0000.0800h
Read/Write    Reset Value: 0000.0000h
Bits 30–0     Reserved
Bit 31        Software Reset Flag
              0 = GLINT Delta is ready for use
              1 = GLINT Delta is being reset and must not be used
```

Interrupt Enable Register

The Interrupt Enable Register allows for a number of GLINT Delta flags to generate a PCI interrupt. Two interrupt sources are defined below. At reset all interrupts sources are disabled.

DIntEnable

```
Region: 0 Offset: 0000.0808h
Read/Write Reset Value: 0000.0000h
Bit 0 DMA interrupt enable
      0 = Disable interrupt (RESET)
      1 = Enable interrupt
Bit 3 Error interrupt enable
      0 = Disable interrupt (RESET)
      1 = Enable interrupt The conditions which cause the
          above interrupts to be generated are described in
          section 3.2.3.
```

Interrupt Flags Register

The Interrupt Flags Register shows which interrupts are outstanding on GLINT Delta. Flag bits are reset by writing to this register with the corresponding bit set to a 1. Flags at positions where the bits are set to 0 will be unaffected by the write.

DIntFlags

```
Region: 0 Offset 0000.0810h
Read/Write Reset Value: 0000.0000h
Bit 0 DMA Flag
      0 = No interrupt (RESET)
      1 = Interrupt outstanding
Bit 3 Error Flag
      0 = No interrupt (RESET)
      1 = Interrupt outstanding
```

The DMA flag is set on the completion of a DMA transfer. The Error Flag is set for the following error conditions:

1) Input FIFO error. The GLINT Delta input FIFO has been written to when full. The data is discarded and this error flag is set. N.B. If input FIFO disconnect is enabled, then this flag will never be set as the GLINT Delta will stop the FIFO from overfilling.
2) DMA Error. The GLINT Delta input FIFO has been written to while a DMA transfer was in process. The data in the input FIFO becomes corrupt and hence subsequent GLINT Delta operations are indeterminate.

Error Flags Register

The Error Flags Register shows which errors are outstanding on GLINT Delta. Flag bits are reset by writing to this register with the corresponding bit set to a 1. Flags at positions where the bits are set to 0 will be unaffected by the write.

DErrorFlags

```
Region: 0 Offset: 0000.0838h
Read/Write Reset Value: 0000.0000h
Bit 0 Input FIFO Error Flag
      Flag set on write to full input FIFO
      0 = No error (RESET)
      1 = Error outstanding
Bit 2 DMA Error Flag
      Flag set on write to input FIFO when DMA in operation
      0 = No error (RESET)
      1 = Error outstanding
```

Test Register

The test register is not to be used by any user software. Writes to this register have an undefined effect. The GLINT Delta powers up in functional mode.

DTestRegister

Region: 0 Offset: 0000.0848h
Read/Write Reset Value: 0000.0000h

FIFO Disconnect Register

The FIFO Disconnect Register enables input FIFO disconnect on GLINT Delta. Disconnect is disabled at reset.
DFIFODis Region: 0 Offset: 0000.0868h
Read/Write Reset Value: 0000.0000h
Bit 0 Input FIFO Disconnect enable
0 = Disabled (RESET)
1 = Enabled

Graphics Core Registers

All the Graphics Core registers in the GLINT Delta, GLINT 300SX/500TX and PERMEDIA are addressed in this part of region 0. The address for each register and associated data fields is defined in the appropriate Programmers Reference Manual, which are incorporated by reference above.

Graphics Core FIFO Interface

The Graphics Core FIFO interface provides a port through which both GC register addresses and data can be sent to the input FIFO. A range of 4 KBytes of host space is provided although all data may be sent through one address in the range. ALL accesses go directly to the FIFO, the range is provided to allow for data transfer schemes which force the use of incrementing addresses. Before writing to the input FIFO the user must check that there is sufficient space by reading the InFIFOSpace register.

If the FIFO interface is used, then data is typically sent to the GLINT Delta in pairs, an address word which addresses the register to be updated, followed by the data to be sent to the register. Note that the GC registers can not be read through this interface. Command buffers generated to be sent to the input FIFO interface may be read directly by the GLINT Delta by using the DMA controller.

A data formatting scheme is provided to allow for multiple data words to be sent with one address word where adjacent or grouped registers are being written, or where one register is to be written many times. More information on the direct FIFO interface data buffer formats, tangential to the present embodiments, may be found in the GLINT Delta, GLINT 300SX/500TX and PERMEDIA Programmers Reference Manuals, incorporated by reference above. Note that the FIFO interface can be accessed at 32 bit boundaries, to allow a direct copy from a DMA format buffer.

PCI Signal DC Specifications

| Symbol | Parameter | Min | Max | Unit |
|---|---|---|---|---|
| VPIL | Input Low Voltage | | Note 1 | V |
| VPIH | Input High Voltage | Note 1 | | V |
| VPOL | Output Low Voltage | | 0.5 | V |
| VPOH | Output High Voltage | 2.4 | | V |
| IPIL | Input Low Current | | Note 1 | mA |
| IPIH | Input High Current | | Note 1 | mA |
| CPIN | Input Capacitance | | 10 | pF |

PCI Signal DC Specifications

| Symbol | Parameter | Min | Max | Unit |
|---|---|---|---|---|
| CCLK | PCI Clock Input Capacitance | | 12 | pF |
| CIDSEL | PCI Idsel Input Capacitance | | 8 | pF |

Note 1: This value is PCI 2.1 compliant.

Pin Descriptions

The Table provides a brief description of each pin. The following pin type definitions are used:
I Input signal
O Output signal
I/O Bi-directional signal
OD Open drain output
P PCI compatible output
NC No connect Pin Descriptions

| Symbol | Type | Power | Pin Number(s) | Description |
|---|---|---|---|---|
| Clocks | | | | |
| PCIClk | I | | 170 | PCI clock. |
| MClk | I | | 126 | System clock. Used for all internally clocked functions on the chip. |
| SCIClk | I | | 139 | SCI clock. |
| SCIClkOut(3.0) | O | P | 156–159 | SCI clock drivers. |
| PCI Interface | | | | |
| PCIRstN | I | | 162 | Power On and Hardware reset. |
| PCIAD(31:0) | I/O | P | 165,171,173–175, 1–3,7,11–13,15–17, 19,31,33–35,38–40, 42,44,46,47,49–51, 54,55 | PCI Address and Data bus. |
| PCICBEN(3:0) | I/O | P | 5,20,30,43 | PCI command and bytes enables. |
| PCIPar | I/O | P | 29 | PCI parity bit. |
| PCIFrameN | I/O | P | 21 | PCI frame control line. |
| PCIIRdyN | I/O | P | 24 | PCI Initiator Ready. |
| PCITRdyN | I/O | P | 25 | PCI Target Ready. |
| PCIStopN | I/O | P | 28 | PCI Target Stop control. |
| PCIIdsel | I | | 6 | PCI slot configuration select line. |
| PCIDeveselN | I/O | P | 26 | PCI Target selected. |
| PCIReqN | O | P | 167 | PCI Master request line. |
| PCIGntN | I | | 166 | PCI Master Grant line. |
| PCIIntAN | OD | P | 161 | PCI interrupt line. |
| PCIFIOInsDis | O | P | 144 | PCI disconnect |

Pin Description Notes

1. PCIFIFOInDis is currently unused and hence should be left unconnected.

2. The signals SCIFrameN(0:1), SCIIRdyN(0:1), SCITRdyN(0:1), SCIStopN(0:1), SCIDevselN(0:1) and SCIIntAN should all be pulled high regardless of the number of devices fitted to the secondary PCI bus.

3. ModeCtl0 is used for Windows 95 compatibility. If ModeCtl0 is pulled high, then GLINT Delta will override the PCI base and sub class reported by devices on the secondary PCI bus. GLINT Delta and any GLINT rendering device on the secondary PCI bus will have 00h reported as their PCI base class and 00h reported as their PCI sub-class. Any VGA device on the secondary PCI bus will have 00h reported as its PCI base class and 01h reported as its PCI sub-class. These values are required for Windows 95 compatibility. It is recommended that this pin is pulled high.

4. If ModeCtl1 is pulled high, then the PCI Maximum Latency is forced to zero. If ModeCtl1 is pulled low, then the PCI Maximum Latency will be set to 80h.

5. VGAEn is pulled high to indicate that secondary device 0 is a VGA device. If no VGA device is fitted, then this pin should be pulled low.

6. The TestMode pin should be pulled low. The other test pins (TestAClk, TestBClk, TestCClk, TestGClk) may be left unconnected.

7. SCIAD28 should be connected to PCIIdsel of a device fitted as secondary device 0 and SCIAD29 should be connected to PCIIdsel of a device fitted as secondary device 1.

8. GLINTInDis0 should be connected to pin 47 of a GLINT rendering device fitted as secondary device 0 and GLINTInDis1 should be connected to pin 47 of a GLINT rendering device fitted as secondary device 1.

9. If a GLINT rendering device is fitted as secondary device 0, then GLINTInDis0 should be pulled low, otherwise GLINTInDis0 should be pulled high. If a GLINT rendering device is fitted as secondary device 1, then GLINTInDis1 should be pulled low, otherwise GLINTInDis1 should be pulled high. 1. If a device is fitted to secondary device 0, then ExtFuncEn0 should be pulled high, otherwise ExtFuncEn0 should be pulled low. If a device is fitted to secondary device 1, then ExtFuncEn1 should be pulled high, otherwise ExtFuncEn1 should be pulled low.

N.B. 1. A pin should be pulled high by connecting to +5 V via a 10K resistor. A pin should be pulled low by connecting to ground via a 10K resistor.

2. Pins marked as NC must NOT be connected.

Delta Processor Unit

The GLINT Delta is a 80 MFLOPS setup processor, designed to break the 3D geometry bottleneck on PCs. GLINT Delta calculates the slope and setup information for any 3Dlabs rendering device, e.g. GLINT 300SX/500TX or PERMEDIA. These products are described fully in their respective Hardware Reference Manuals and Programmer's Reference Manuals, which are hereby incorporated by reference. These manuals are available, as of the effective filing date of this application, from 3Dlabs Inc. Ltd., 181 Metro Drive, Suite 520, San Jose Calif. 95110. By performing high precision floating point to fixed point conversion, GLINT Delta allows the software geometry pipeline to pass vertex information in standard floating point format.

Coupling GLINT Delta with a 3Dlabs rendering device can typically double system performance while significantly reducing the load on the CPU and the PCI bus. The setup calculations are general purpose and may be used to accelerate any 3D API, including OpenGL, Direct3D, AutoDesk's Heidi and Apple's QuickDraw 3D.

The GLINT Delta adds extra 3D graphics acceleration to the 3Dlabs rendering devices by implementing the slope and setup calculations for triangles and lines in hardware. Offloading these calculations from the host processor typically doubles 3D system performance. The processing required on the host is greatly reduced and much less data is passed from the host to the graphics subsystem.

The Delta Unit in the GLINT Delta implements the slope calculations and data conversion for graphics primitives in one unit. This unit can be considered as being positioned in front of the rasterizer in the GLINT 300SX/500TX or PERMEDIA pipelines. The GLINT Delta accepts the coordinates of vertices plus color, depth, fog and texture parameters. The Delta Unit calculates the parameters required by the GLINT 300SX/500TX or PERMEDIA. GLINT Delta will accept the input parameters in either fixed point format or IEEE single precision floating point format. Internal calculations in GLINT Delta are performed in floating point format. Vertex sharing for meshes, fans and polylines is supported with the shared vertices only being loaded once. An optional normalize operation may be applied to texture parameters. This operation calculates the maximum absolute value of the texture parameters for a primitive and normalizes all the texture parameters to lie in range −1.0 to 1.0. Normalizing the texture parameters ensures that maximum accuracy is achieved by the texture unit in the GLINT 500TX and PERMEDIA.

The operations in the Delta Unit remove a considerable amount of work from the host processor. However since the transformation and lighting calculations are still performed by software on the host processor, GLINT Delta is able to support all the widely available 3D graphics APIs.

According to one disclosed class of innovative embodiments, there is provided a multifunction PCI adapter, comprising: a PCI connection connected to a PCI port of a host system; a sub-port for connecting at least one device having at least one PCI-compatible function; hardware for executing at least one internal PCI-compatible function; function mapping logic to map said internal function and said functions of said device to a single PCI function set; address mapping logic to map device memory addresses of said device and internal memory addresses of said adapter to and from system memory addresses of said host system; and message passing logic to pass messages between said host system and said PCI device.

According to another disclosed class of innovative embodiments, there is provided a PCI-compatible graphics processor and adapter, comprising: a PCI connection connected to a PCI port of a host system; a sub-port for connecting at least one device having at least one graphics processor with a corresponding PCI-compatible function; at least one internal graphics processor with a corresponding PCI-compatible function; function mapping logic to map said internal functions and said functions of said device to a single PCI function set; address mapping logic to map device memory addresses of said device and internal memory addresses of said adapter to and from system memory addresses of said host system; and message passing logic to pass messages between said host system and said PCI device; wherein each said graphics processor processes graphics data in conjunction with at least one other said graphics processor.

According to another disclosed class of innovative embodiments, there is provided a method for adapting a single-function device to a multi-function computer port, comprising using an adapter device to perform the steps of: receiving a query from a processor at boot time, and sending a reply through said port to said processor, said reply indicating that a multifunction device is attached to said port; mapping said device to a specific function address on said port; mapping system memory addresses received from said processor to corresponding memory address on said device, upon receiving memory access requests from said processor, said memory address being accessible by said processor; receiving an enable signal from said processor and passing said enable signal to said device; accessing said remapped memory of said device according to access requests to said system memory addresses from said processor; passing messages between said device and said processor, after performing any appropriate address translations according to said remapping steps.

According to another disclosed class of innovative embodiments, there is provided a method for adapting a multi-function PCI compatible device to a multi-function PCI compatible computer port via an adapter having an internal function and memory, comprising the steps of: receiving a query from a processor at boot time, and sending a reply through said port to said processor, said reply indicating that a multifunction device is attached to said port; mapping each function of said device and said internal function to specific function addresses on said port; mapping system memory addresses received from said processor to corresponding memory address on said device, upon receiving memory access requests from said processor, said memory address being accessible by said processor; mapping system memory addresses received from said processor to corresponding memory address to said internal memory on said adapter, upon receiving memory access requests from said processor, said memory address being accessible by said processor; receiving an enable signal from said processor and passing said enable signal to said device; accessing said remapped memory of said device according to access requests to said system memory addresses from said processor; accessing said remapped memory of said device according to access requests to said system memory addresses from said processor; passing messages between said device and said processor, after performing any appropriate address translations according to said remapping steps; and processing instructions sent to said adapter from said processor or said device according to said internal function.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

The foregoing text has indicated a large number of alternative implementations, particularly at the higher levels, but these are merely a few examples of the huge range of possible variations.

For example, the preferred chip context can be combined with other functions, or distributed among other chips, as will be apparent to those of ordinary skill in the art.

For another example, the described graphics systems and subsystems can be used, in various adaptations, not only in high-end PC's, but also in workstations, arcade games, and high-end simulators.

For another example, the GLINT Delta may include more than one internal function, or accomodate more than two external functions on the secondary PCI port.

For another example, while the preferred embodiments are directed at a multifunction PCI adapter, the innovative methods and systems may be adapted to other bus specifications by those skilled in the art.

What is claimed is:

1. A multifunction PCI adapter, comprising:
    a PCI connection connected to a PCI port of a host system;
    a sub-port for connecting at least one device having at least one PCI-compatible function;
    hardware for executing at least one internal PCI-compatible function;
    function mapping logic to map said internal function and said functions of said device to a single PCI function set;
    address mapping logic to map device memory addresses of said device and internal memory addresses of said adapter to and from system memory addresses of said host system; and
    message passing logic to pass messages between said host system and said PCI device.

2. The adapter of claim 1, wherein said device includes at least one graphics function.

3. The adapter of claim 1, wherein at least one of said internal functions is a PCI-compatible graphics function.

4. The adapter of claim 1, wherein said sub-port is a PCI bus.

5. The adapter of claim 1, wherein said host system interfaces with said adapter and said PCI device as a single multifunction PCI device.

6. A PCI-compatible graphics processor and adapter, comprising:
    a PCI connection connected to a PCI port of a host system;
    a sub-port for connecting at least one device having at least one graphics processor with a corresponding PCI-compatible function;
    at least one internal graphics processor with a corresponding PCI-compatible function;
    function mapping logic to map said internal functions and said functions of said device to a single PCI function set;
    address mapping logic to map device memory addresses of said device and internal memory addresses of said adapter to and from system memory addresses of said host system; and
    message passing logic to pass messages between said host system and said PCI device;
    wherein each said graphics processor processes graphics data in conjunction with at least one other said graphics processor.

7. The adapter of claim 6, wherein said device includes at least one graphics function.

8. The adapter of claim 6, wherein at least one of said internal functions is a PCI-compatible graphics function.

9. The adapter of claim 6, wherein said sub-port is a PCI bus.

10. The adapter of claim 6, wherein said host system interfaces with said adapter and said PCI device as a single multifunction PCI device.

11. A method for adapting a single-function device to a multi-function computer port, comprising the steps of, in an adapter device which is connected to a host system:

receiving a query from a processor at boot time, and sending a reply through said port to said processor, said reply indicating that a multifunction device is attached to said port;

mapping said device to a specific function address on said port;

mapping system memory addresses received from said processor to corresponding memory addresses on said device, upon receiving memory access requests from said processor, whereby said memory addresses are accessible by said processor;

receiving an enable signal from said processor and passing said enable signal to said device;

accessing said remapped memory of said device according to access requests to said system memory addresses from said processor;

passing messages between said device and said processor, after performing any appropriate address translations according to said remapping steps.

12. The method of claim 11, wherein said device includes graphics processing functions.

13. The method of claim 11, further comprising the step of mapping a read-only memory from said device to said internal memory.

14. A method for adapting one or more multi-function PCI compatible devices to a multi-function PCI compatible computer port comprising the steps of:

receiving a query from a processor at boot time, and sending a reply through said port to said processor, said reply indicating that a multifunction device is attached to said port;

mapping each function of said devices to specific function addresses on said port;

mapping system memory addresses received from said processor to corresponding memory addresses on said device, upon receiving memory access requests from said processor, whereby said memory address are accessible by said processor;

receiving an enable signal from said processor and passing said enable signal to said device;

accessing said remapped memory of said device according to access requests to said system memory addresses from said processor;

passing messages between said device and said processor, after performing any appropriate address translations according to said remapping steps.

15. The method of claim 14, wherein said device includes graphics processing functions.

16. The method of claim 14, wherein said internal function performs setup calculations for graphical rendering.

17. A method for adapting a multi-function PCI compatible device to a multi-function PCI compatible computer port via an adapter having an internal function and memory, comprising the steps of:

receiving a query from a processor at boot time, and sending a reply through said port to said processor, said reply indicating that a multifunction device is attached to said port;

mapping each function of said device and said internal function to specific function addresses on said port;

mapping system memory addresses received from said processor to corresponding memory address on said device, upon receiving memory access requests from said processor, said memory address being accessible by said processor;

mapping system memory addresses received from said processor to corresponding memory address to said internal memory on said adapter, upon receiving memory access requests from said processor, said memory address being accessible by said processor;

receiving an enable signal from said processor and passing said enable signal to said device;

accessing said remapped memory of said device according to access requests to said system memory addresses from said processor;

accessing said remapped memory of said device according to access requests to said system memory addresses from said processor;

passing messages between said device and said processor, after performing any appropriate address translations according to said remapping steps; and processing instructions sent to said adapter from said processor or said device according to said internal function.

18. The method of claim 17, wherein said device includes graphics processing functions.

19. The method of claim 17, wherein said internal function performs setup calculations for graphical rendering.

20. The method of claim 17, further comprising the step of mapping a read-only memory from said device to said internal memory.

* * * * *